June 26, 1934.   J. W. JONES   1,964,260
COLOR HARMONIZING CHART
Filed Sept. 19, 1932   2 Sheets-Sheet 1

INVENTOR.
Jason W. Jones.
BY
ATTORNEY.

June 26, 1934.  J. W. JONES  1,964,260
COLOR HARMONIZING CHART
Filed Sept. 19, 1932  2 Sheets-Sheet 2
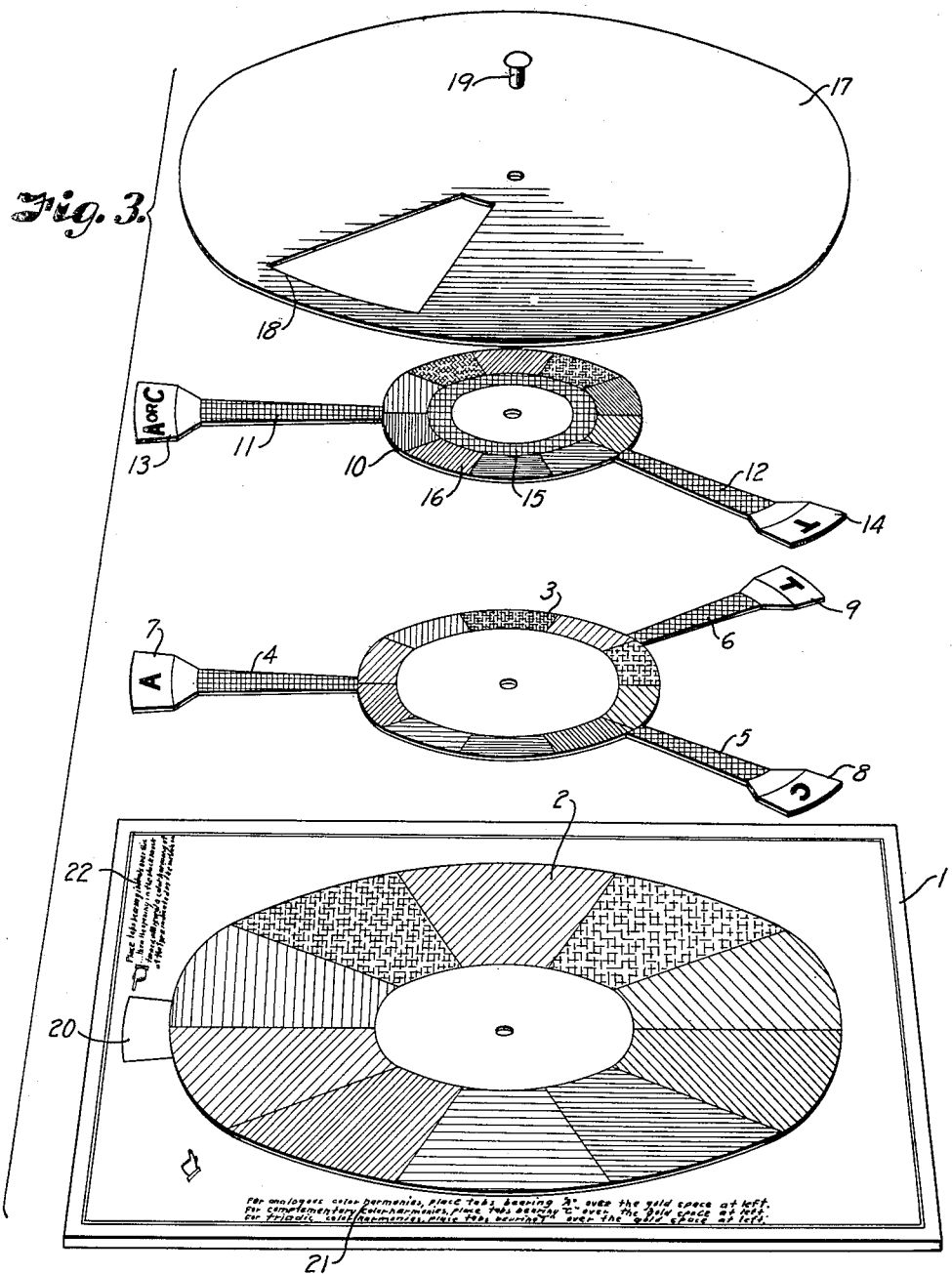
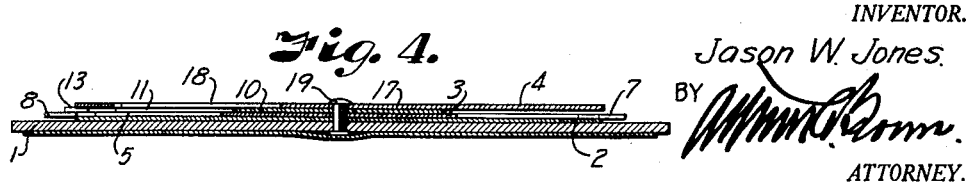
INVENTOR.
Jason W. Jones.
BY
ATTORNEY.

Patented June 26, 1934

1,964,260

UNITED STATES PATENT OFFICE 1,964,260

COLOR HARMONIZING CHART

Jason W. Jones, Kansas City, Mo., assignor to Cook Paint & Varnish Company, Kansas City, Mo., a corporation of Delaware Application September 19, 1932, Serial No. 633,745

4 Claims. (Cl. 88—14)

This invention relates to color harmonizers, and more particularly to a color chart and comparator for use as a guide for paint manufacturers, interior decorators, painters, designers architects, ink manufacturers, printers, textile manufacturers, and other in analogous professions and trades, to facilitate the selection of combinations of colors in good usage that produce harmonious effects upon the eye and mind.

There are a number of types of color harmonies among which the analogous, complementary and triadic color harmonies are in current use, and with which this invention primarily deals.

It is generally known in color using arts that solar spectrum rays and pigment spectrum colors are produced by the absorption and reflection of white light rays, resulting in the primary colors, blue, red and yellow, and that mixtures of these primary colors in different predetermined proportions produce other colors, as well as shades, tints and blends of all the colors, from a pure white through a deep purple to a neutralized grey of no color at all, and that these colors have constant qualities, such as hue (the amount of coloring matter), value (quantitative reflection of white light), and chroma (the purity of color reflection).

It is also generally known in color using arts that analogous color combinations are produced by mixtures and blends of predominantly the same color; that complementary color combinations are produced by mixtures and blends of two predominantly opposed and contrasting colors; and that triadic color combinations are produced by mixtures and blends of three predominantly distinct colors, no two of which are in such direct contrast as the two colors employed in complementary color harmonies. It is thus possible to produce a very great number of combinations of color in different shades, tints, and tones.

To a person not particularly trained in the science of color harmonies, however, a selection of appropriate color schemes for different occasions presents a difficult problem. It is, therefore, the principal object of my invention to provide a device which, upon very simple manipulation, suggests schemes or combinations of colors which produce harmonious psychological effects due to the scientifically correct layout and operation of this device according to the predetermined laws of colors.

It is a further object of this invention to provide a device which is automatic and accurate in suggestion of colors, yet which anyone untrained in color science may use for quickly selecting color combinations for any type of color harmony in good usage.

In accomplishing these and other objects of my invention, I have provided improved details of structure, the preferred form of which is illustrated in the accompanying drawings, wherein:

Fig. 3 is a perspective view of the device in disassembled relation.

Fig. 4 is a central cross section on the line 4—4, Fig. 1.

Figure 1:
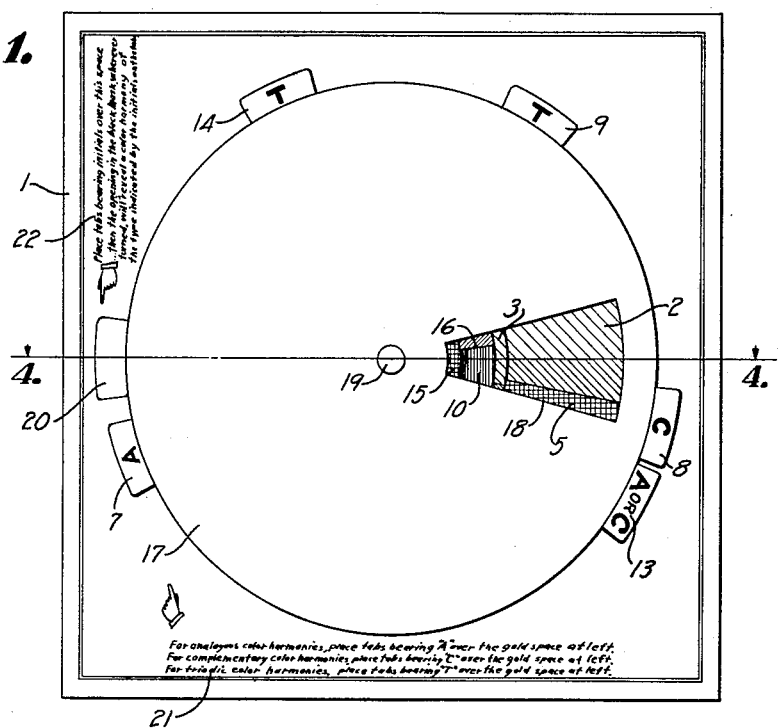
Fig. 1 is a plan view showing the arrangement of my device used in connection with a mask.
Figure 2:
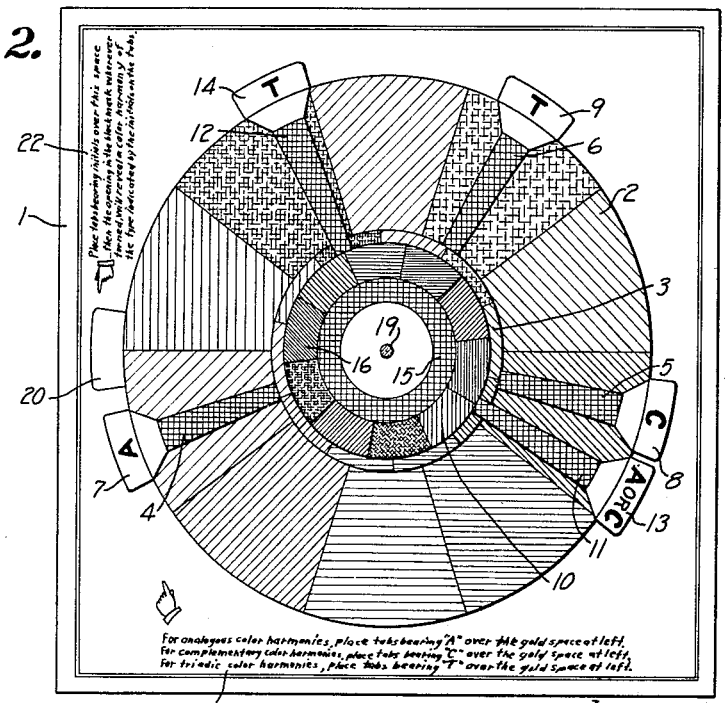
Fig. 2 is a plan view of my device with mask removed, showing the arrangement of base-board, disks, and indicator tabs.

Referring more in detail to the drawings:

1 designates a base-board of cardboard, or the like, upon which is glued, or otherwise secured, a disk 2, preferably of lighter weight cardboard. Superimposed upon the disk 2 is a second disk 3, preferably of the same material, smaller in diameter than the disk 2, having outwardly extending fingers 4, 5 and 6 provided with tabs 7, 8 and 9 enlarged to bear suitable indicia later to be described.

A third disk 10, preferably of the same material as the other disks and smaller in diameter than the disk 3, is superimposed upon the disk 3 and is provided with outwardly extending fingers 11 and 12 having enlarged tabs 13 and 14 to bear later described indicia.

The disk 10 is preferably provided with a ring 15 of a neutralized grey, and an outer ring 16 divided into diagonal sectors bearing the spectrum colors in their full intensity, complementary colors preferably being diametrically opposite each other.

The disk 3 is also divided into diagonal sectors bearing the colors of the spectrum, but in a lighter hue than in the outer rim of the disk 10, the colors being arranged similarly to those on the disk 10 with complementary colors preferably positioned diametrically opposite each other. Only the outer marginal rim of the disk 3 need be colored as described, but the entire disk is preferably colored for the reason that some variation in the diameter of the disk 10 might be deemed necessary.

The disk 2 is colored in diagonal sectors similarly to those of the other two disks, the colors of the disk 2 being of the same hue as the disk 3.

The sequence of the hues on each disk should be similar, though not necessarily the same in number, and should preferably be different in value and chroma. The logical sequence is that in which the various hues of the spectrum naturally occur. It is also preferable that on each disk as complete, regular and gradual a representation of the spectrum be made as is practicable.

A mask 17 of cardboard of solid color is provided to substantially cover and align with the outer circumference of the disk 2 and is superimposed upon all of the disks, a sector shaped opening 18 being cut in the mask in such a manner that the colors of each disk will appear in a divisional sector therethrough. A pin or brad 19 is provided to hold the mask and disks 3 and 10 in position and permit said disks and mask to revolve about the pin as an axis.

Referring now to the fingers on the disks 3 and 10, the tabs at the outer extremity of each are provided with indicia denoting the type of color harmony which will be obtained when the tab is operated in a manner later to be described. These indicia bearing tabs are so positioned with reference to the hues on the disks that when tabs on the disk 3 are superimposed, selectively, over the tabs bearing a similar indicia on the disk 2, the opening 18 of the mask reveals, wherever turned, colors which combine to produce a harmony of the type indicated by the common indicia on the tabs. The tabs 7, 8 and 9 on the disk 3, respectively bear indicia "A", denoting analogous color harmonies, "C" denoting complementary color harmonies, and "T" denoting triadic color harmonies. The tab 13, on the disk 10, bears indicia "A or C", denoted that either analogous or complementary color harmonies may be obtained when using this tab with either the tab 7 or 8 of the disk 3, and the tab 14 bears indicia "T", denoting triadic color harmony.

A marker 20 is provided on the base-board as a starting point for deriving various color harmonies. Sets of rules 21 and 22 are also provided for the convenience of the user of the device.

Assuming a device to be constructed and assembled as described, the operation thereof is as follows:

A color harmony, for example, an analogous color harmony, having been chosen, the user places the corresponding tab 7 of the disk 3, bearing the indicia "A", over the starting mark 20. He then moves the upper disk 10 by means of the tabs thereon to a position at which the tab 13, bearing the indicia "A or C" is superimposed upon the tab "A" of the disk 3. Then by revolving the mask, the opening 18 thereof registers over each divisional sector of the disks 2, 3 and 10 and a color combination may be obtained to suit the need of the user.

Complementary color harmony combinations are similarly revealed by first placing the indicia tab 8 of the disk 3, bearing the indicia "C", over the space 20, superimposing the tab 13 of the disk 10, bearing the indicia "A or C", thereupon and revolving the mask so that the opening therein may register with harmonious color combinations of complementary colors.

Triadic color harmony combinations are also similarly shown by first placing the indicia tab 9 of the disk 3, bearing the indicia "T", over the space 20, superimposing the tab 14 of the disk 10, bearing a like indicia "T", thereupon and revolving the mask so that the opening therein may register over each divisional sector of the disks 2, 3 and 10, whereby harmonious triadic color combinations may be obtained.

It is thus apparent that this invention provides a simple device, easily operated, and capable of obtaining innumerable color harmonies of the various types of harmony in colors.

What I claim and desire to secure by Letters Patent is:

1. A color harmonizer including a baseboard having a starting mark and instructions printed thereon, a plurality of disks of progressively lesser diameters superimposed upon the baseboard and revolvable in relation to each other and bearing the colors of the spectrum, the top disk colors being of full intensity and the other disks being of different hue, value and chroma, fingers on the disks having tabs bearing suitable indicia and adapted to selectively register with corresponding tabs on the different disks and with said starting mark so that predetermined colors are aligned to form harmonious combinations, and means for retaining the disks and base-board in revolving relation.

2. In a device of the character described, a base, superimposed disks of different diameters and divided into sectors representing the colors of the spectrum, the colors on each individual disk being of the same intensity and of different value and chroma in relation of disk to disk, indicators on the disks bearing indicia representing analogous, complementary and triadic color harmony combinations and adapted for registration with each other for suggesting harmonious color combinations, a mask having a sector shaped opening adapted to register with a sector composed of colors of the disks for forming color harmony combinations indicated by the indicia bearing tabs on the indicators, and means for retaining the disks and base in revolving relation.

3. In a device of the character described, a fixed disk divided into sectors, a second disk of smaller diameter than the first disk revolvably mounted above the fixed disk and divided into sectors corresponding to the sectors of the first named disk and having a plurality of fingers, a third disk of smaller diameter than the second disk revolvably mounted upon the second disk and divided into sectors corresponding to the sectors of the first and second disks and having fingers selectively alignable with the fingers of the second named disk to form color combinations, a mask having a sector shaped opening revolvably mounted upon the third disk whereby the mask opening may be selectively aligned with sectors of all the disks to show color combinations, and means for retaining the mask and fingered disks in revolving relation to the fixed disk.

4. In a device of the character described, a base board, a disk fixed to the base board and divided into sectors, a second disk of smaller diameter than the first disk revolvably mounted above the fixed disk and divided into sectors corresponding to the sectors of the first named disk and having a plurality of fingers, a third disk of smaller diameter than the second disk revolvably mounted upon the second disk and divided into sectors corresponding to the sectors of the first and second disks and having fingers selectively alignable with the fingers of the second named disk to form color combinations, and means for retaining the mask and fingered disks in revolving relation to the base and fixed disk.

JASON W. JONES.